United States Patent [19]
Haber et al.

[11] Patent Number: 6,081,227
[45] Date of Patent: Jun. 27, 2000

[54] METHOD AND APPARATUS FOR BEAM MANAGEMENT IN A SATELLITE COMMUNICATION SYSTEM

[75] Inventors: William Joe Haber, Tempe; George Thomas Kroncke, Gilbert, both of Ariz.

[73] Assignee: Motorola, Inc., Schaumburg, Ill.

[21] Appl. No.: 09/002,794

[22] Filed: Jan. 5, 1998

[51] Int. Cl.$^7$ .................................................. H04B 7/185
[52] U.S. Cl. ........................................ 342/354; 455/13.3
[58] Field of Search .................................... 342/354, 358; 455/12.1, 13.3

[56] References Cited

U.S. PATENT DOCUMENTS

| | | | |
|---|---|---|---|
| 5,268,694 | 12/1993 | Jan et al. | 342/354 |
| 5,408,237 | 4/1995 | Patterson et al. | 342/354 |
| 5,422,647 | 6/1995 | Hirshfield et al. | 342/354 |
| 5,621,415 | 4/1997 | Tuck | 342/354 |
| 5,668,556 | 9/1997 | Rouffet et al. | 342/354 |
| 5,736,959 | 4/1998 | Patterson et al. | 342/354 |
| 5,738,309 | 4/1998 | Fowell | 244/171 |
| 5,739,784 | 4/1998 | Jan et al. | 342/354 |

FOREIGN PATENT DOCUMENTS

| | | |
|---|---|---|
| 2070082 | 5/1992 | Canada . |
| 9309614 | 5/1993 | WIPO . |

OTHER PUBLICATIONS

PCT International Search Report, International application No. PCT/US 99/00003, International Filing Date Apr. 1, 1999.

*Primary Examiner*—Mark Hellner
*Attorney, Agent, or Firm*—Jennifer B. Wuamett; Timothy J. Lorenz

[57] ABSTRACT

A method (400, FIG. 4) for beam management in a satellite communication system (10) which simplifies cell-to-cell hand-offs within a footprint (90) of a satellite (20) and between two or more satellites (20) is disclosed. The method includes the steps of providing multiple beam stripes (130, FIG. 2) extending across the footprint (90) in a direction corresponding to the direction of flight (60) of the satellite, grouping the beam stripes (130) into one or more beam groups (150, FIG. 3), and selectively associating hardware groups (300) comprised of hardware resources to support beam groups (150). Method (400) also can include steps (450–470) for determining and compensating for undesirable system effects arising as a result of the relative motion of the Earth (50, FIG. 1) with respect to satellites (20) of system (10). A satellite (20, FIGS. 10 and 11) designed and configured to execute method (400) also is disclosed.

35 Claims, 9 Drawing Sheets

METHOD AND APPARATUS FOR BEAM MANAGEMENT IN A SATELLITE COMMUNICATION SYSTEM

CROSS-REFERENCE TO RELATED APPLICATIONS

This application is related to the following U.S. Patent Application, which is assigned to the same assignee as the present invention: U.S. patent application Ser. No. 08/963,300, filed on Oct. 30, 1997, entitled "Method and Apparatus for Assigning Communication Resources Based on Grouping System Communication Units".

FIELD OF THE INVENTION

This invention relates generally to the field of satellite communication systems and methods of operation thereof. More specifically, this invention relates to a method and apparatus for beam management in a satellite communication system.

BACKGROUND OF THE INVENTION

In recent years, the telecommunication industry has seen the development and deployment of the first commercial Nongeostationary Orbit (NGSO) satellite constellations to respond to the rapidly expanding demand for global telecommunication services. Such satellite communication systems have the potential to provide worldwide and/or regional coverage at a much lower cost than would be possible using a terrestrial network. Such satellite communication systems also have the potential for providing economical services to virtually any point on the Earth through satellite-to-satellite and satellite-to-ground links, even to remote or sparsely populated areas where it may not be economically feasible to deploy a terrestrial network. Of various satellite communication systems that have been proposed, some propose to provide world-wide coverage, while others propose to provide regional coverage, or coverage within a particular latitude band. Among these satellite communication systems, use of satellite constellations designed with both polar and inclined orbits have been proposed.

In NGSO satellite communication systems, or networks, satellites move at relatively rapid speeds over the surface of an underlying celestial body, such as the Earth. As it sweeps over the surface of the Earth, an NGSO satellite projects a satellite "footprint" made up of a number of radio frequency (RF) "beams" or "cells" toward system users located on or near the surface of the Earth. In this context, a "cell" is defined as the coverage area formed on the Earth's surface by a single antenna beam, and a satellite "footprint" is defined as the aggregation of all cells formed by the antenna/s of a single satellite. A cell contains multiple channels. Desirably, channel access is allocated by frequency, time, by coding, or by a combination of frequency, time, and/or coding to the cells of the system such that communications occurring in adjacent cells use different channels to minimize the effect of interference between channels.

Because each NGSO satellite is visible to a particular system user for relatively small increments of time (typically only for several minutes), communications having a duration of more than several minutes will be handled through a "hand-off" process through the network, which involves switching communication service between cells or beams of a single satellite footprint and between cells or beams of different satellites within the satellite communications system to ensure continuous communication.

Typically, when a hand-off occurs, a communication unit (CU), such as a communication device being used by a system user to communicate through the system is assigned a new time/frequency channel in the next beam or cell. Each such hand-off event requires the exchange of signaling messages between the satellite and the CU.

Also, because hardware resources cannot be simultaneously connected to more than one beam (or cell) it becomes necessary to assign separate hardware resources to each user, or more precisely to each CU employed by each user, as a CU is passed on to different cells of a single satellite and/or to cells of different satellites. Hand-off paths of different users tend to be nonuniform as CUs are handed-off between cells.

Nonuniform hand-off paths among multiple users complicate the hardware resource switching process, complicate satellite payload requirements, and can impose significant burdens on the entire satellite communication system in terms of processing capability and power requirements.

Earth-fixed satellite cells have been proposed to provide a low earth orbit (LEO) satellite communication system which ameliorates the burdens of complex switching arising from frequent hand-offs. An example of an earth-fixed satellite cellular system is described in U.S. Pat. No. 5,408,237 entitled "Earth-Fixed Cell Beam Management for Satellite Communication System." Earth-fixed systems can minimize cell-to-cell hand-off. However, a drawback of earth-fixed satellite cellular systems is that these systems do not compensate for demand variations because the focal direction for projection of a satellite footprint is predetermined. Moreover, each cell in an earth-fixed cellular system has a fixed capacity. Thus, only a number of subscribers not exceeding a particular cell's capacity can use the system at a given time.

Thus, a solution to the problem of providing a high capacity satellite communication system which minimizes the deleterious effects associated with cell-to-cell hand-offs continues to elude the satellite communications industry. Therefore, what is needed is a method and apparatus to simplify the hand-off process in an NGSO satellite communication system.

BRIEF DESCRIPTION OF THE DRAWINGS

The invention is pointed out below with particularity in the appended claims. However, other features of the invention will become more apparent and the invention will be best understood by referring to the following detailed description in conjunction with the accompanying drawings in which:

Figure 1:
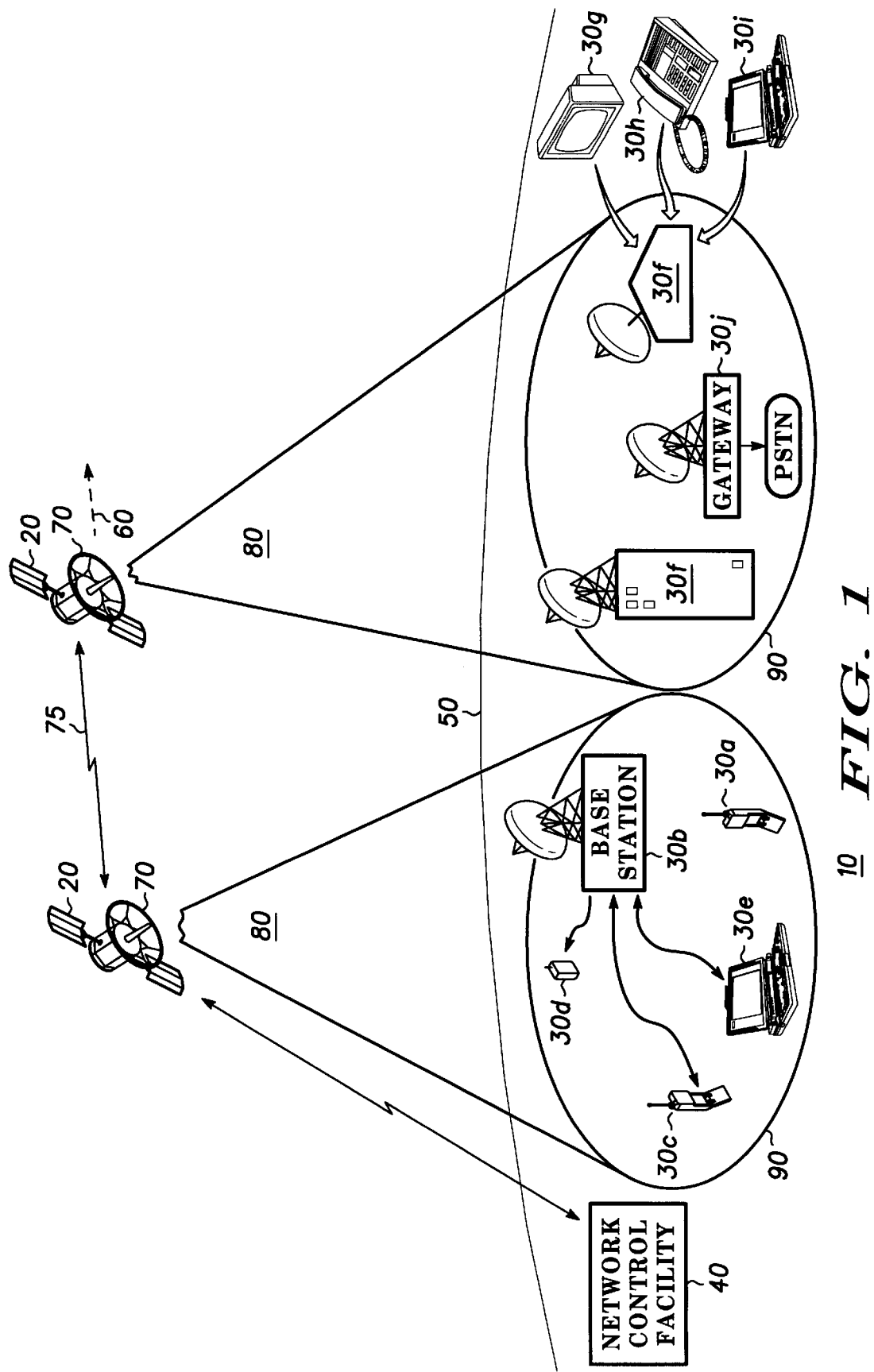
FIG. 1 illustrates a highly simplified diagram of a portion of a satellite communication system in accordance with a preferred embodiment of the present invention.

The exemplification set out herein illustrates a preferred embodiment of the invention in one form thereof, and such exemplification is not intended to be construed to be limiting in any manner.

DETAILED DESCRIPTION OF THE DRAWINGS

The present invention provides, among other things, a method and apparatus for beam management in a satellite communications system comprised, at least in part, of satellites which move with respect to the surface of the Earth. The present invention also provides a method and apparatus for managing hardware resources in a satellite communications system.

An advantage of the method and apparatus of the present invention is that it can greatly simplify the complexity of the satellite payload by managing satellite beams or cells in a manner which optimizes beam performance and decreases the payload capability requirements by providing a satellite footprint that simplifies the hand-off process. These advantages are accomplished, at least in part in various embodiments, by partitioning a satellite footprint into stripes or columns referred to as "beam stripes" extending across the satellite footprint, grouping the beam stripes into "beam groups" comprised or one or more "beam stripes", and selectively associating groups of hardware resources or "hardware groups" with beam groups. A hardware group can then support communications within the beam group to which the hardware groups is assigned, thereby minimizing the complex switching that would otherwise be required if significant lateral hand-offs were required or if a CU were to be passed through a random cell path, as in prior art systems. Beam group width and composition can be adjusted to compensate for the relative motion of the Earth (and of CUs located on or near the surface of the Earth) with respect to the satellite's orbital track, which causes an offset of a longitudinal axis of a satellite footprint from its desirable alignment with system users on the ground.

Another advantage of the method and apparatus of the present invention is that it provides an improved satellite control technique to enhance utilization of satellite hardware resources. This advantage is accomplished, at least in part, in a preferred embodiment, by adjusting at least one satellite attitude parameter while a satellite is in orbit to compensate for the relative motion of the Earth with respect to a point on the ground to align the orientation of the satellite footprint generally parallel with a desired ground track of system users through a footprint.

A "satellite" as used throughout this description means a man-made object or vehicle intended to orbit the Earth. A "satellite" could be a NGSO satellite, including, but not limited to, low-Earth and medium-Earth orbiting satellites. A "constellation" means a number of satellites arranged in orbits for providing specified coverage (e.g., radio communication, remote sensing, navigation, etc.) of a portion, portions or all of the Earth. A constellation typically includes multiple rings (or planes) of satellites and could have an equal number of satellites in each plane, although this is not essential. The term "orbit" as used herein refers to any trajectory of movement above a celestial body, including, for example, circular and elliptical trajectories. The terms "cell", "beam" and "antenna pattern" are not intended to be limited to any particular mode of generation and include those created by either terrestrial or space-based telecommunication systems and/or combinations thereof. Moreover, although the present invention is described in a preferred embodiment in terms of applicability in a satellite communication system, the method and apparatus of the present invention could also be employed in satellite systems other than communication systems, including, for example, systems for remote sensing, resource mapping, sale of information from space, navigation (or global positioning), and others.

FIG. 1 illustrates a highly simplified diagram of a portion of a satellite communication system in accordance with a preferred embodiment of the present invention. System 10 comprises at least one satellite 20 and any number of communication units (CUs) 30. Preferably, system 10 also includes at least one network control facility (NCF) 40, which desirably receives telemetry from satellites 20 and controls operations of satellites 20. Generally, satellites 20, CUs 30, and NCF 40 of telecommunication system 10 could be viewed as a network of nodes. All nodes of communication system 10 are or could be in data communication with other nodes of communication system 10 through communication links. In addition, all nodes of telecommunication system 10 are or could be in data communication with other telephonic devices dispersed throughout the world through public service telephone networks (PSTNs) and/or conventional terrestrial communication devices coupled to a PSTN through conventional terrestrial base stations.

In a preferred embodiment, the present invention is applicable to space-based telecommunication systems that assign particular regions on a celestial body, such as Earth 50, to specific cells on Earth 50, and preferably to systems that move cells across the surface of Earth 50. Although the present invention is applicable to space-based telecommunication systems 10 having at least one satellite 20 in low-Earth orbit, medium-Earth or other NGSO, satellite 20 is preferably in low-Earth orbit around Earth inclined at 48° with respect to the Earth. However, the present invention is also applicable to space-based telecommunication systems 10 having satellites 20 which orbit Earth at any angle of inclination including polar, equatorial, inclined or other orbital patterns. Satellite 20 could be a single satellite or one of many satellites 20 in a constellation of satellites orbiting Earth 50. The present invention is applicable to systems where full coverage of Earth is not achieved (i.e., where there are "holes" in the telecommunication coverage provided by the constellation) and to systems where plural coverage of portions of Earth occur (i.e., more than one satellite is in view of a particular point on the Earth's surface).

Preferably, each satellite 20 communicates with other nearby satellites 20 through cross-links 75. These cross-links 75 form a backbone of space-based communication system 10. Thus, a call or communication from a CU 30 located at any point on or near the surface of the Earth so could be routed through satellite 20 or a constellation of satellites 20 to within range of substantially any other point on the surface of the Earth. Cross-links 75 shown in system 10, although desirable, are not necessary or critical to practice the present invention.

CUs 30 could be located anywhere on or near the surface of the Earth or in the atmosphere above the Earth. System 10 could accommodate any number of CUs 30. CUs 30 preferably are communication devices capable of receiving and/or transmitting voice and/or data from satellites 20 and/or NCF 40. The term communication unit (CU) is intended to encompass any device capable, either directly or indirectly, of sending or receiving signals, in the form of radiated energy or otherwise, from a satellite. By way of example, CUs 30 could be hand-held, mobile satellite cellular telephones 30a adapted to transmit to and receive transmissions from satellites 20 and/or NCF 40, or could be base station 30b capable of relaying signals between satellites 20 and telecommunication devices such as stationary telephones or mobile telephones 30c, pagers 30d, and/or mobile computer terminals 30e to name a few. Moreover, CUs 30 could, for example, be fixed computer terminals capable of sending email messages, video signals or facsimile signals. For example, CU 30 also could be a relatively stationary terminal 30f located on, near or in a premises or building, such as a house or a place of business, wherein the CU can be configured to receive and/or send signals from or to one or more satellites 20. CU 30 then could forward the signals in appropriate form to one or more devices in communication with CU 30, such as for example, television 30g, telephone 30h, computer 30i, or other similar device. The term CU also encompasses gateways 30j on or near the surface of the Earth 50 coupled to a PSTN.

In a preferred embodiment of the present invention, CUs 30 communicate with satellites 20 using a limited portion of the electromagnetic spectrum that is divided into numerous channels. The channels are preferably L-Band, K-Band, S-band frequency channels or combination thereof, but could encompass Frequency Division Multiple Access (FDMA) and/or Time Division Multiple Access (TDMA) and/or Code Division Multiple Access (CDMA) communication or any combination thereof. Other methods could be used as known to those of ordinary skill in the art.

FIG. 1 depicts two satellites 20 traveling along an orbital pathway in a direction of flight 60 above the surface of the Earth 50. Each satellite 20 includes at least one radiation interface, such as a multibeam, directional antenna 70. Each antenna 70 is capable of either transmitting, receiving, or both transmitting and receiving, radiated energy, and preferably projects at least one beam of radiated energy 80 toward the surface of the Earth. As used herein, the term "radiated energy" refers to any and all forms of energy transported from one location to another, including all forms of waves and particles. "Radiated energy" includes either or both electromagnetic and optical radiation.

Where satellite 20 is a telecommunication satellite, each beam of radiated energy 80 projected by satellite 20 illuminates an area on the surface of the Earth. The entire area illuminated by the one or more beams projected by each satellite 20 is collectively referred to as the satellite "footprint" 90. Footprint 90 could represent either a transmission or reception zone for radiated energy.

Figure 2:
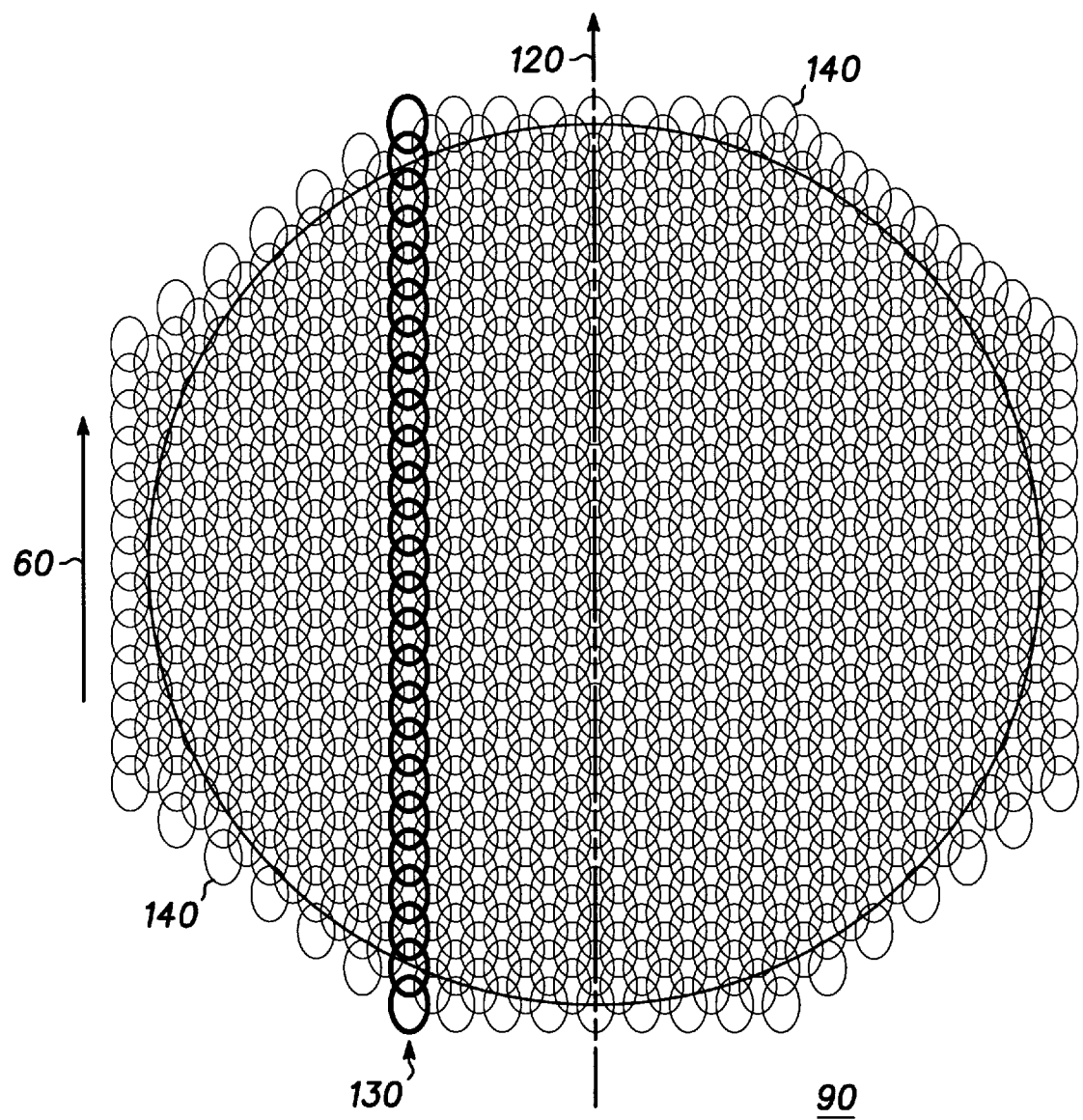
FIG. 2 illustrates a beam pattern of a satellite footprint in accordance with a preferred embodiment of the present invention.

FIG. 2 illustrates a beam pattern of a satellite footprint in accordance with a preferred embodiment of the present invention. Footprint 90 has a longitudinal axis 120, which desirably is substantially aligned with a velocity vector representing a direction of flight 60 of satellite 20 (FIG. 1). Desirably, although not necessarily, footprint 90 is divided into multiple cells 140. For convenience, FIG. 2 illustrates cells 140 as being generally oval shapes and footprints 90 as being discrete, generally circular shapes. However, one skilled in the art will understand that in actual practice, cells and footprints projected from the satellite could take on other shapes and could, for example, be elliptic, hexagonal, rectangular or square. In a preferred embodiment, some overlap of cells 140 would occur. However it is not necessary that cells 140 overlap to practice the present invention.

As illustrated in FIG. 2, cells 140 desirably are arranged in columns of single cells 140 across footprint 90 generally in line with longitudinal axis 120. Each column of cells comprises a beam stripe 130. In a preferred embodiment of the present invention, beam stripes are arranged into beam groups to facilitate beam and hardware management, as discussed in more detail with reference to FIGS. 3 and 4. Alternatively, beam stripes 130 could comprise as few as a single cell extending across footprint 90.

Figure 3:
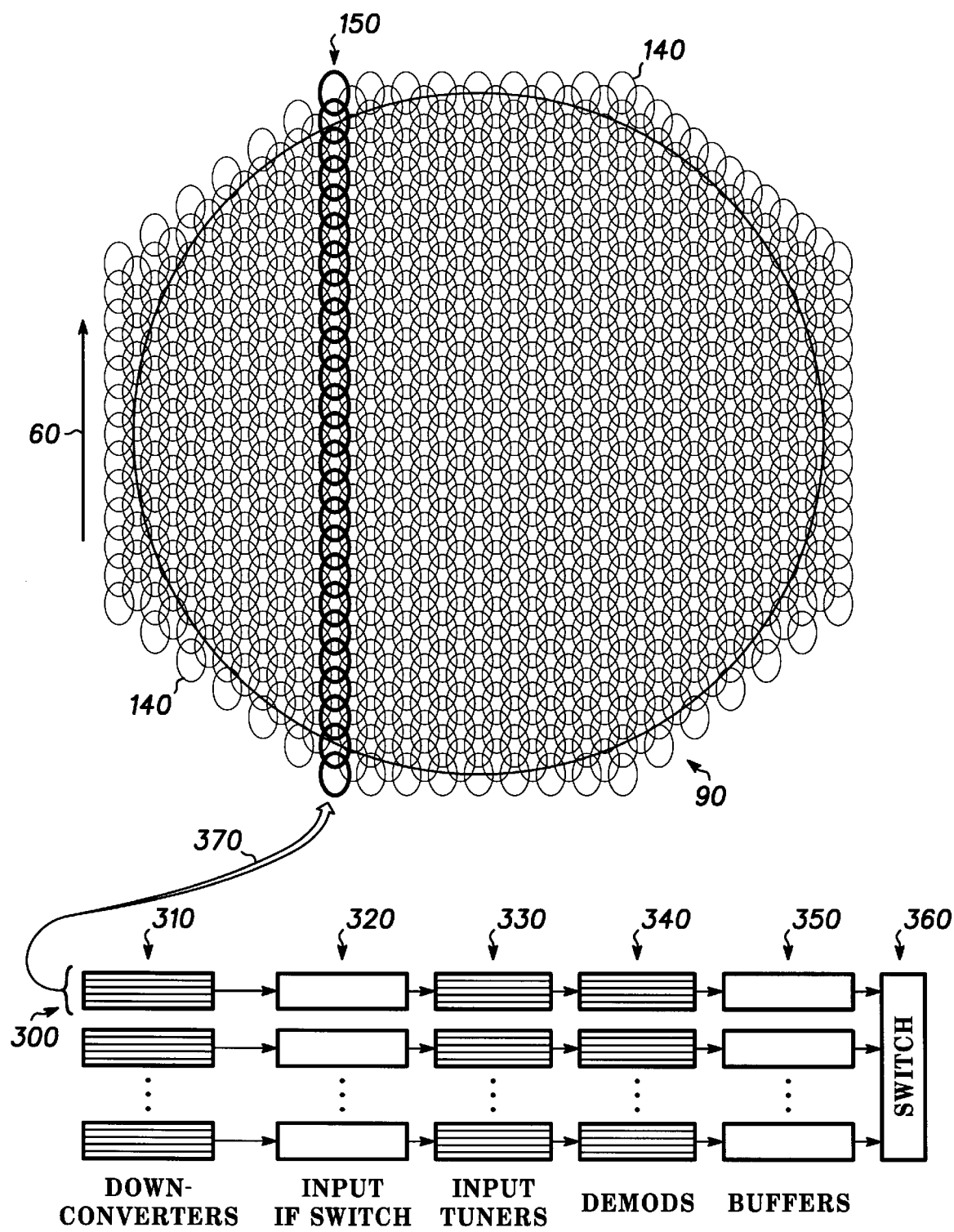
FIG. 3 illustrates a schematic depiction of an example of a hardware group assignment to a beam group in accordance with a preferred embodiment of the present invention.

FIG. 3 illustrates a schematic depiction of an example of a hardware group assignment to a beam group in accordance with a preferred embodiment of the present invention. Satellite 20 (FIG. 1) contains multiple hardware resources, or items of hardware equipment such as, for example, one or more down converters 310, one or more input intermediate frequency (IF) switches 320, one or more input tuners 330, one or more demodulators (Demods) 340, and/or one or more buffers 350 connected to switch 360. Similar hardware groups could be used for providing downlink signals, and could include, for example, one or more upconverters, output IF switches, output tuners, modulators, and/or output buffers. In prior art satellite communication systems, satellite hardware resources generally must be capable of supporting communications that are passed through nonaligned, nonuniform cell paths within a given satellite footprint. Thus, complex switching between numerous items of hardware equipment is required as a CU is handed off from one cell to the next. This creates a tremendous burden on the satellite and dramatically complicates payload requirements.

In a preferred embodiment of the present invention, satellite hardware resources are grouped into one or more hardware groups 300 which desirably are capable of supporting communications (e.g. transmitting or receiving radiated energy or signals through footprint 90) with a CU as a CU is passed through a beam group 150 of footprint 90. Assigning hardware groups to support beam groups dramatically alleviates the complexity of switching demands on the satellite payload and provides a significant improvement over prior art systems.

Figure 4:
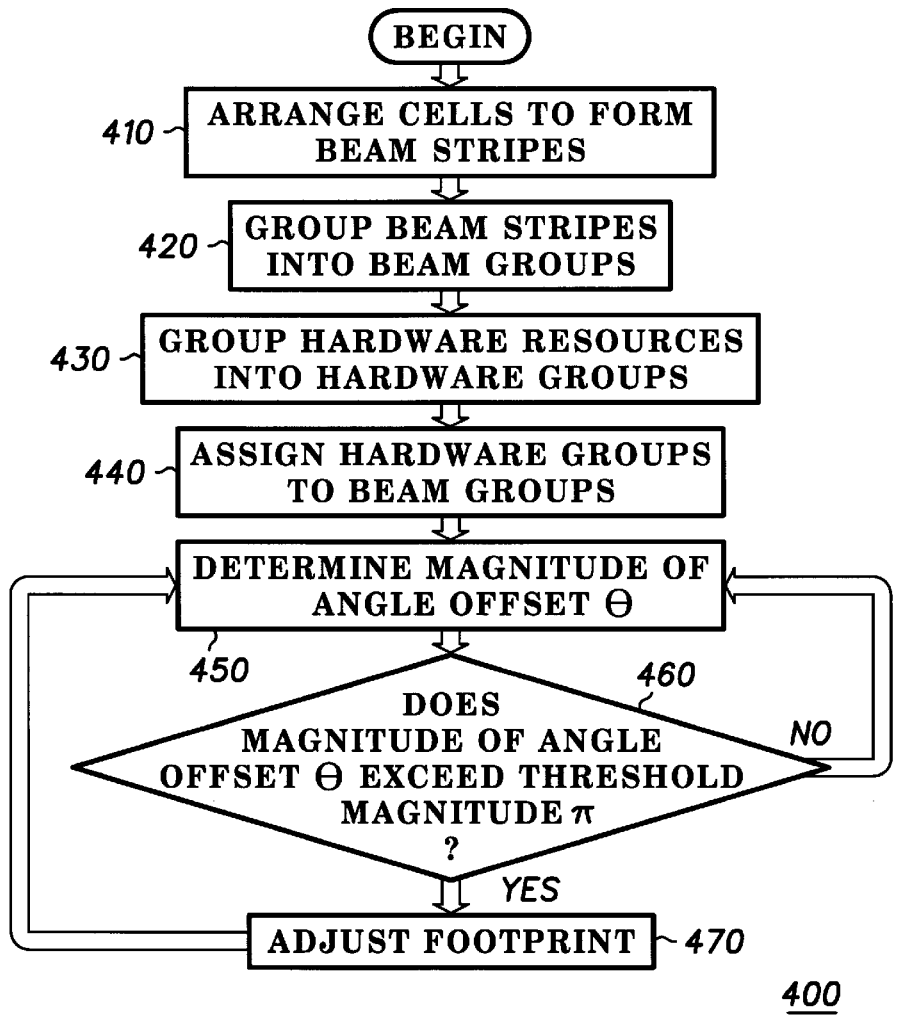
FIG. 4 illustrates a method for beam management which optimizes beam performance in a satellite communication system in accordance with a preferred embodiment of the present invention.

FIG. 4 illustrates a method for beam management which optimizes beam performance in a satellite communication system in accordance with a preferred embodiment of the present invention. Method 400 desirably is practiced in a satellite communication system having at least one CU 30 (FIG. 1) and at least one satellite 20 (FIG. 1) capable of providing at least one beam of radiated energy 80 (FIG. 1) for projecting a footprint 90 (FIG. 1) on or near the surface of the Earth. Preferably, method 400 is practiced in a satellite communication system having multiple CUs 30 and multiple satellites 20. Desirably, each satellite 20 in system 10 is designed and configured to execute method 400, although in some embodiments, one or more steps of method 400 could be performed by other system nodes. Method 400 assumes that satellite 20 is capable of providing a footprint 90 (FIG. 2) containing multiple cells 140 (FIG. 2), however, footprint 90 need not necessarily be divided or partitioned into multiple cells to practice the present invention.

Method 400 begins in step 410 when multiple cells 140 of footprint 90 are arranged into beam stripes 130 (FIG. 2), or columns of cells extending across footprint 90 in the direction of longitudinal axis 120 (FIG. 2). Footprint 90 could contain any number of cells 140, but in a preferred embodiment of the present invention, footprint 90 contains 504 cells, arranged to form 26 beams stripes. Although footprint 90 is depicted in FIG. 2 as being partitioned or divided into multiple cells, footprint 90 could, instead, be partitioned into one or more beam stripes extending across footprint 90 in the direction of longitudinal axis 120 without dividing or partitioning footprint 90 into multiple cells. In effect, each beam stripe could be made up of a single cell extending across an entire length of footprint 90 without departing from the spirit of the present invention.

In step 420, beam stripes are grouped into one or more beam groups 150 (FIG. 3). Beam groups 150 can be comprised of as few as one beam stripe 130, as illustrated in FIG. 3 where beams groups 150 are comprised of a single column of cells 140, or beam groups 150 can be comprised of multiple beam stripes 130. The number of beam stripes 130 included in a beam group 150 is referred to herein as the "width" of a beam group 150. As discussed in more detail below, the width of beam groups 150 (i.e. the number of beam stripes and/or cells included in the beam group in a direction perpendicular to longitudinal axis 120) can be varied to accommodate system demands and other variables encountered by system 10. The example of a hardware group assignment to a beam group in FIG. 3, shows beam group 150 depicted as a darkened row of cells 140, and being comprised of only a single beam stripe 130 (i.e., in FIG. 3, beam group 150 is equivalent to beam stripe 130, FIG. 3). This example is set forth for illustrative purposes and is not intended to limit the scope of the present invention.

In step 430, hardware resources on board satellite 20 are grouped into hardware groups 300, as previously described with reference to FIG. 3. Note that the specific items of equipment depicted as included in hardware group 300 are set forth for illustrative purposes and are not intended to limit the scope of the present invention. Various other combinations of hardware resources could be employed without departing from the scope of the present invention. For example, demodulators could be replaced with modulators depending on the direction of travel of radiated energy between satellite 20 and CU 30 (e.g. transmission vs. reception of radiated energy) and numerous other types and/or combinations of hardware items could be substituted for hardware items illustrated in FIG. 3 without departing from the scope of the present invention.

In step 440, at least one hardware group 300 is assigned to support communications occurring within at least one beam group 150 of footprint 90. An example of a hardware group assignment is illustrated in FIG. 3, where hardware group 300 is assigned to support beam group 150, as depicted by link arrow 370. In a currently preferred embodiment, hardware group assignments will be made to correlated with specific antenna beam ports within satellite antenna 70 (FIG. 1) as a part of satellite design and configuration processes. Desirably, however, assignments could be dynamically altered while the satellite is in orbit to allow for dynamic adjustments to beam group width.

Steps 410–440 of beam management method 400 vastly improve hardware management on board satellites 20 (FIG. 1) in system 10 (FIG. 1) and simplify channel management dramatically by allowing hardware groups 300 (FIG. 3) to be managed separately. Steps 410–440 of method 400 also allow for significant simplification of satellite payload by minimizing processing and power requirements. Moreover, steps 410–440 of method 400 greatly simplify cell-to-cell hand-offs within a satellite and between adjacent satellites by minimizing hardware switching as communication units are passed between cells within the same beam group.

Method 400 could end with step 440. However, in a preferred embodiment of the present invention, method 400 also includes steps 450–470, which enable the advantages of steps 410–440 of method 400 to be more fully realized. Inclusion of steps 450–470 in method 400 could be used to compensate for undesirable effects on system 10 arising as a result of the relative motion of the Earth beneath satellite 20 as satellite 20 orbits the Earth. These steps will be explained in more detail with reference to FIG. 7.

Figure 5:
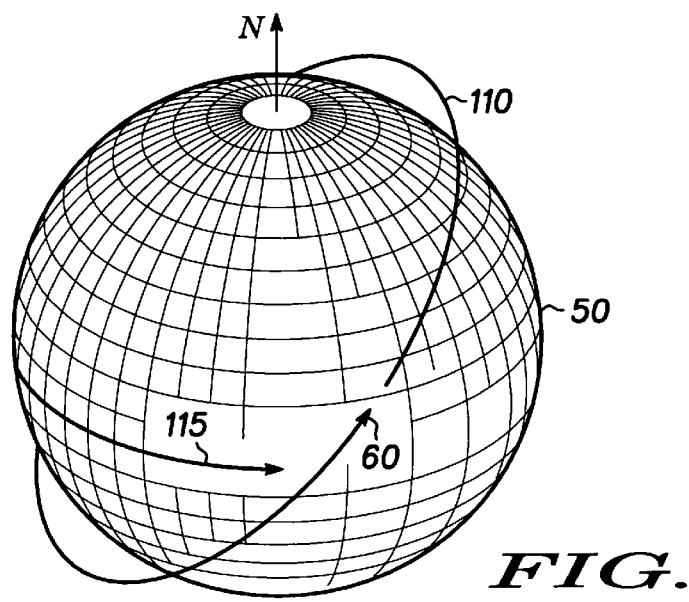
FIG. 5 illustrates a schematic depiction of an orbital track of a satellite orbiting the Earth shown in relation to the relative motion of the Earth.

FIG. 5 illustrates a schematic depiction of an orbital track of a satellite orbiting the Earth shown in relation to the relative motion of the Earth. As shown in FIG. 5, as satellite 20 (FIG. 2) moves along direction of flight 60 above the Earth 50 in an orbital track 110, the Earth also is rotating in a West-to-East direction 115 beneath satellite 20.

Figure 6:
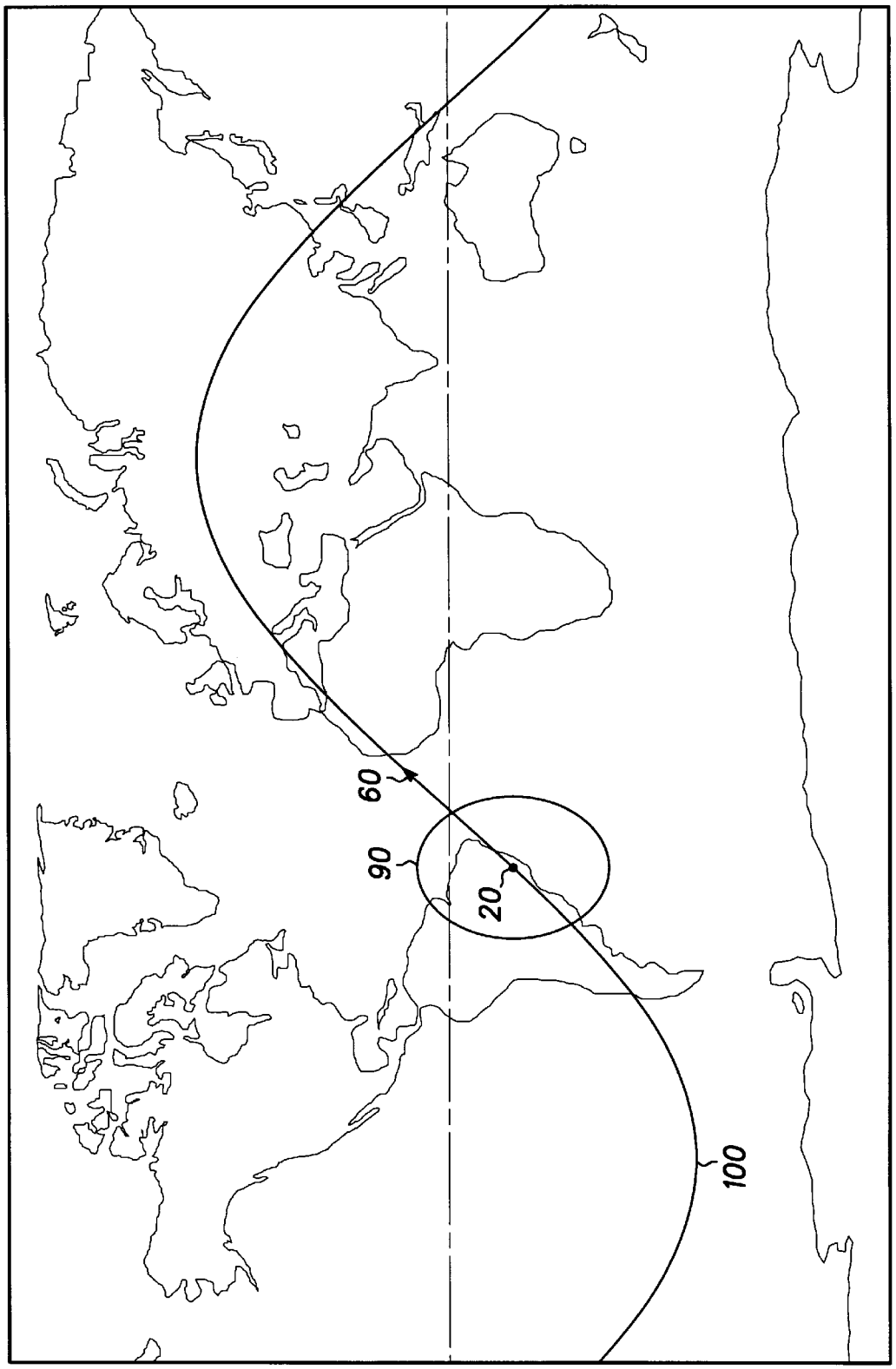
FIG. 6 illustrates a schematic depiction of a satellite ground track of a satellite orbiting the Earth in an orbit inclined at 48° with respect to the Earth.

FIG. 6 illustrates a schematic depiction of a satellite ground track of a satellite orbiting the Earth in a circular orbit inclined at 48°. FIG. 6 shows an overhead view of a portion of the Earth from a satellite 20. As satellite 20 moves in its orbital track 110 (FIG. 5) above the Earth, satellite projects a corresponding ground track 100, or a path on or near the Earth's surface. Footprint 90 travels along ground track 100. In most LEO satellites, the satellite is flown with the roll axis of the satellite in line with the direction of flight 60 (FIG. 1) of the satellite. When a satellite is orbiting the Earth at the northern and southern extremes of its orbit (whether the satellite is flying in an inclined orbit, in accordance with a preferred embodiment of the present invention, or whether the satellite is flying in a polar or other orbit), velocities of the Earth and the satellite are aligned, and no apparent sideways motion of the satellite is seen from the ground.

Viewed from the satellite looking toward the ground, points on the Earth (and likewise system users or CUs located on or near the Earth) pass through the satellite footprint in line with the satellite orbital track as represented in FIG. 2 by a velocity vector representing the direction of motion 60 of the satellite orbital track (which is substantially parallel to the ground track 100 (FIG. 6) at these points). However, as a satellite moves away from the northern and southern extremes of its orbit, and approaches the equator, an offset arises between a vector representing direction of flight 60 (FIG. 2) of the satellite and a vector representing a velocity of one or more fixed points on the ground. As a result of the relative motion of the satellite and the Earth (and consequently of system users and/or CUs located thereon) beneath satellite 20, ground track 100 is offset slightly from satellite orbital track 110 (FIG. 5) at these latitudes. As a result, longitudinal axis 120 (FIG. 2) of footprint 90 is offset slightly from a path of a fixed point (or of a system user or CU) located on or near the surface of the Earth.

Figure 7:
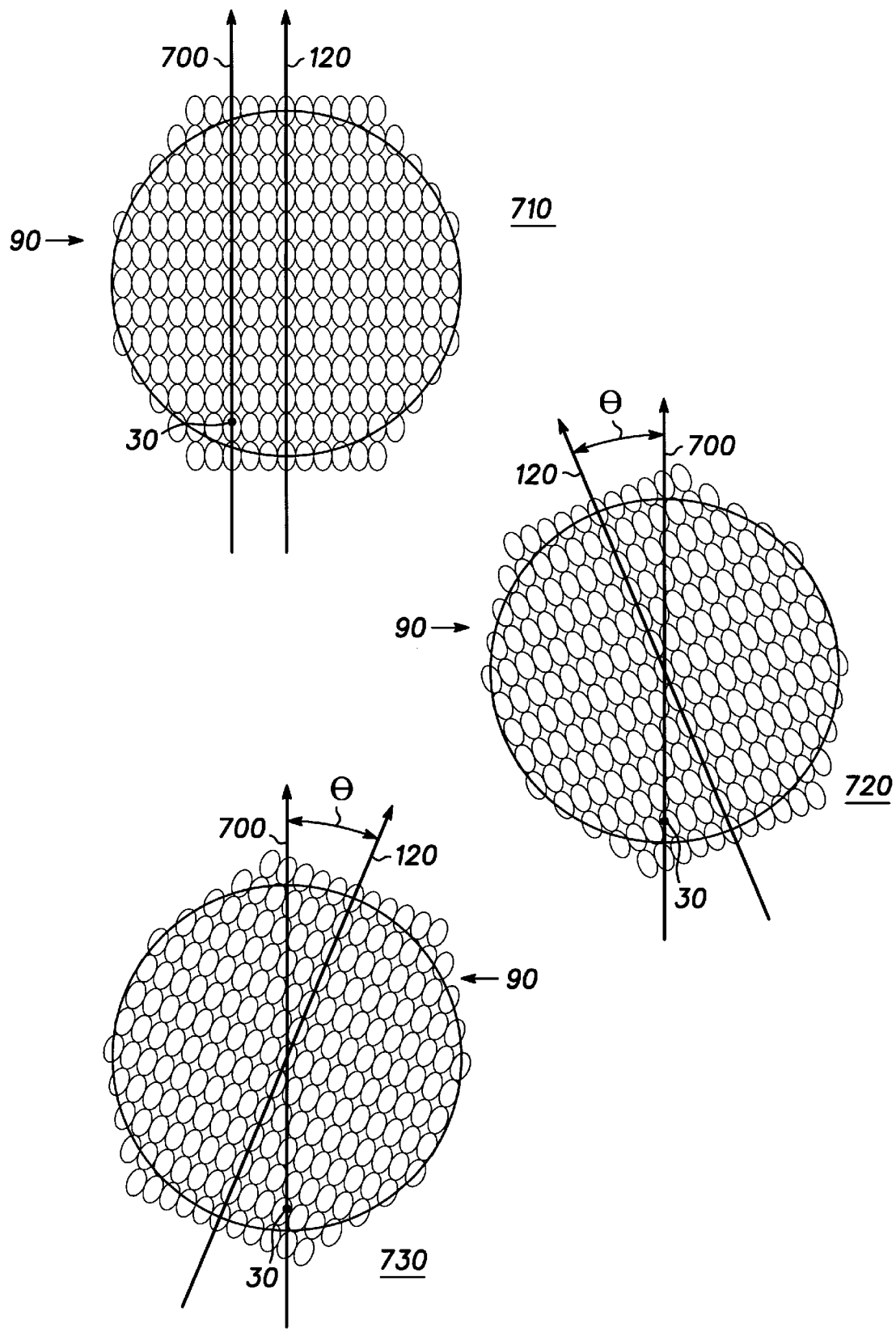
FIG. 7 illustrates an angle offset arising between a longitudinal axis of a satellite footprint and a system user or CU being passed through the footprint as the satellite travels in its orbit.

FIG. 7 illustrates an angle offset arising between a longitudinal axis of a satellite footprint and a system user or CU being passed through the footprint as the satellite travels in its orbit. In block 710, CU track 700 represents a track or pathway a system user or CU 30 would follow through footprint 90 as a satellite projecting footprint 90 passes over the CU's location on the Earth and as the CU is handed-off from cell to cell, or as the CU is passed within a single beam stripe (which could or could not be partitioned or divided into multiple cells) within footprint 90 when the satellite projecting footprint 90 is located at a point near the northern or southern extremes of its orbital track (i.e., at a point distant from the equator). Although CU track 700 is discussed herein in terms of a location of a system user or CU for purposes of illustration, CU track 700 could represent a vector drawn with respect to any relatively fixed point on or near the surface of the Earth to illustrate the effects of the relative motion of the Earth and the satellite with respect to a point on or near the ground. Thus, CU track 700 does not necessarily need to be determined with respect to any particular CU in system 10 (FIG. 1) but rather could be determined with respect to virtually any relatively fixed point on or near the surface of the Earth (or other celestial body).

Longitudinal axis 120 of footprint 90 has an orientation with respect to CU track 700 which varies as a function of latitude. As represented in block 710 of FIG. 7, as a satellite passes through the northern and southern extremes of its orbit, little or no offset is experienced between longitudinal axis 120 of footprint 90 and CU track 700 (e.g. CU track 700 is substantially parallel with longitudinal axis 120). Thus, referring back to FIG. 4, steps 410-440 of method 400 could be carried out, and CU 30 could pass directly through a single beam stripe 130 (FIG. 2) of footprint 90, without any lateral hand-offs to an adjacent beam stripe 130, and a hardware group 300 (FIG. 3) could be assigned to support a beam group 150 (FIG. 3) comprised of a single beam stripe 130 for communications with all CUs located within a coverage area of that single beam stripe. This ideal beam management situation changes as the satellite passes near the equator in its orbit, however, as illustrated in blocks 720 and 730 of FIG. 7.

Block 720 illustrates an overhead view from a satellite traveling in a northbound direction at the equator as it passes over CU 30. As illustrated, longitudinal axis 120 of footprint 90 is no longer substantially parallel with CU track 700 and is offset slightly from CU track 700 as a result of the relative motion of the Earth (and consequently of a CU located thereon, or any other relatively fixed point located thereon) by an angle offset represented as θ. Similarly, block 730 illustrates an overhead view from a satellite traveling in a southbound direction at the equator as it passes over CU 30. For illustration purposes, the magnitude of angle offset θ, has been exaggerated. As a result of the angle offset, CU 30 cannot be passed directly through a single beam stripe 130 (FIG. 2) and lateral passing, or hand-off, would be needed. The magnitude or value of angle offset θ varies as a function of latitude, satellite altitude, inclination of the satellite orbit, and related factors.

Figure 8:
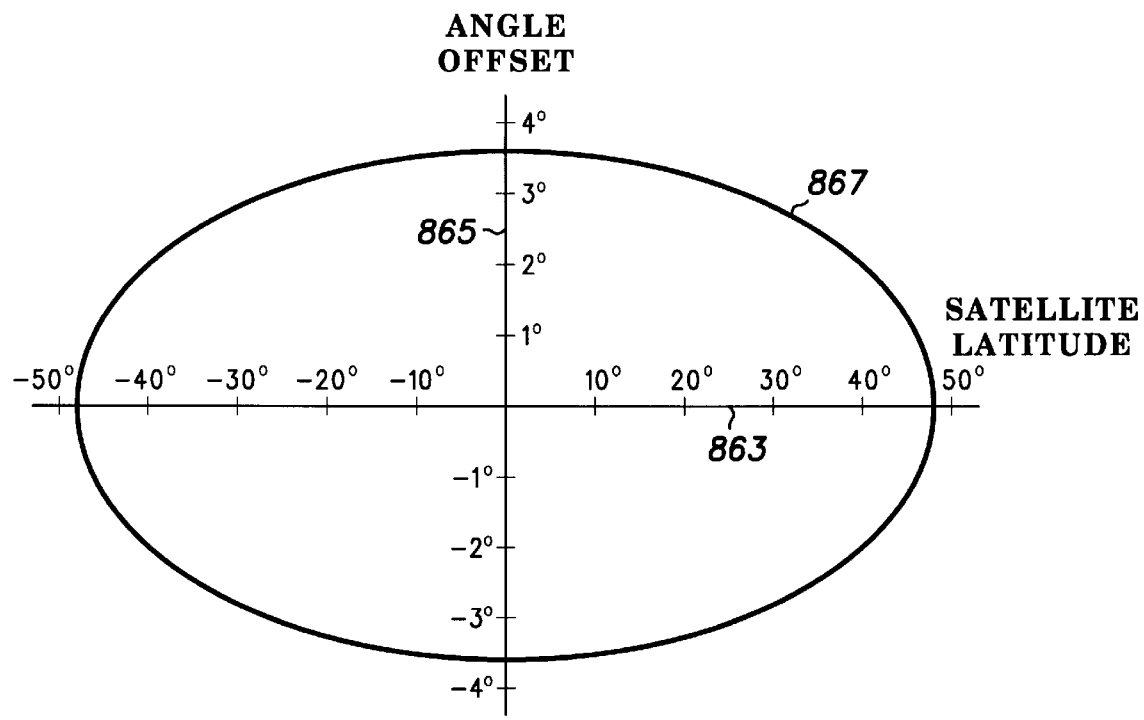
FIG. 8 illustrates a graphical representation of the angle offset encountered at various latitudes as a satellite orbits the Earth in a low earth circular orbit (approximately 1400 kilometers (km)) inclined at 48°.

FIG. 8 illustrates a graphical representation of an angle offset encountered at various latitudes as a satellite orbits the Earth in a low earth circular orbit (approximately 1400 km) inclined at 48°. In graph 800, satellite latitude is plotted on the horizontal axis 863 against angle offset on the vertical axis 865. As illustrated, the angle offset value varies between 0° and near + or –4° between satellite latitudes of + or –50° and 0°, respectively, as determined at the satellite subpoint, or the point on Earth directly beneath the satellite. The oval 867 drawn through horizontal axis 863 and vertical axis 865 depicts the satellite orbit and can be used to extrapolate the magnitude of angle offset θ at the satellite subpoint at various latitudes during a satellite's orbit.

Although graph 800 is representative of the magnitude of angle offset θ encountered by a low earth orbit satellite traveling in an inclined orbit, this is not to be limiting in the present invention, as similar angle offset values will be encountered for satellites traveling in polar orbits or inclined orbits at inclinations of other than 48° and altitudes other than low earth orbit altitudes. Graph 800 represents an example of approximate angle offset values determined as a function of a satellite altitude and orbital inclination for a satellite traveling over a particular latitude. Determination of the magnitude of angle offset θ for virtually any NGSO satellite traveling in either an inclined or a polar orbit can be determined using principles of mathematics and orbital mechanics.

Moreover, FIG. 8 depicts angle offset values determined at a subpoint of a satellite and is representative primarily of angle offset values for a satellite projecting a relatively small footprint. In an alternate embodiment of the present invention, for satellites projecting larger footprints covering multiple degrees of latitude, determination of angle offset values could factor in various additional factors. For example, where a satellite footprint covers multiple degrees of latitude, it could be desirable to adjust a satellite footprint (as discussed in more detail below with reference to steps 450-470 of method 400) in accordance with an angle offset averaging technique, where the satellite footprint is adjusted in accordance with an angle offset value determined as a weighted average of angle offset values determined for various latitudes covered by the footprint, rather than adjusting the satellite footprint in accordance with the angle offset value determined at the subpoint of the satellite.

The angle offset averaging technique noted above include the use of simple mathematical weighted averaging or could include more sophisticated techniques, and could take into account factors such as location of land masses or system user concentration within a large footprint. For example, the angle offset averaging technique could include a step of determining the angle offset value as said weighted average of multiple angle offset values determined for one or more locations within said footprint where said footprint predominately covers land rather than water.

The satellite footprint could be adjusted in accordance with an angle offset value determined at particular positions within the footprint where the footprint predominately covers land rather than water. Information concerning location of land masses could be predetermined by methods known to those of ordinary skill in the art and sent to satellites for use in angle offset determination and determining appropriate footprint adjustment.

Alternatively, footprint adjustments could be made dynamically by, for example, adjusting the satellite footprint in accordance with angle offset values determined as a function of system user concentrations through real-time, on-board processing of signals received from system users (or more specifically from CUs operated by system users) indicating their location. In this embodiment the, angle offset averaging technique noted above could include a step of determining the angle offset value as a weighted average of multiple angle offset values determined for one or more locations within the footprint where the footprint predominately covers a location or area where system users are concentrated.

As previously noted, the existence of the angle offset experienced at various points in the satellite orbit is undesirable from a beam management and hardware management standpoint. Desirably, longitudinal axis 120 (FIG. 2) is aligned with CU track 700, thereby allowing system users (or CUs) to be passed or handed-off in a linear fashion through a single beam stripe 130 (FIG. 2) as satellite 20 passes overhead. Preferably, no lateral hand-offs (i.e., between beam stripes) would be required. However, the angle offset encountered as a result of the relative motion of the Earth and satellite 20 upsets this ideal management approach.

Referring back to FIG. 4 and method 400, steps 450–470 of method 400 can be employed to counter the undesirable effects resulting from the angle offset. In step 450 of method 400, system 10 (FIG. 1) determines the value or magnitude of angle offset θ as a function of latitude and other relevant factors (including, for example, inclination and altitude of the satellite in orbit, size of the satellite footprint, etc.). As noted above, determination of the magnitude of angle offset θ for virtually any NGSO satellite traveling in either an inclined or a polar orbit can be determined using principles of mathematics and orbital mechanics. Step 450 of method 400 could be carried out by a processor operating in conjunction with satellite attitude control devices on board satellite 20 (FIG. 1), or could be executed, at least in part, by other system nodes external to satellite 20, such as NCF 40 (FIG. 1) in combination with satellite 20, or by some other node or combination of nodes. The magnitude or value of angle offset θ could be determined continually on a dynamic basis as the satellite orbits the Earth or could be determined at specified time intervals during orbit. Alternatively, magnitude or value of angle offset θ could be estimated on a predetermined basis and programmed on or communicated to a processor on board satellite 20 in data form corresponding with a graphical depiction of magnitude of angle offset θ as a function of the position or location of the satellite, such as the example set forth in FIG. 8. If satellite 20 knows its location and the latitude on the Earth over which it is traveling at a particular time, it could thus determine the magnitude of angle offset at a particular time based on such predetermined data.

In step 460, once the magnitude of angle offset θ is determined, the system will inquire as to whether the magnitude of angle offset θ exceeds some predetermined threshold value π. This predetermined threshold value π reflects a tolerable minimal angle offset magnitude or value that will not upset the beam management method described with reference to steps 410–440 of method 400 (FIG. 4). Preferably, this threshold value will be zero degrees, but the system could be configured to tolerate an angle offset magnitude slightly greater than zero degrees (i.e., a slight offset between user track 700 (FIG. 7)) depending on the size of cells 140 (FIG. 2) in footprint 90 (FIG. 2).

If the system determines in step 460 that the magnitude of angle offset θ does not exceed threshold value π at the particular time when the magnitude of angle offset is measured, the system will not proceed to make any adjustments to the satellite footprint to correct for an angle offset value, step 450 will be repeated, and the system will continue to determine the angle offset value as the satellite continues to orbit the Earth and passes over different latitudes. If, on the other hand, the magnitude of angle offset exceeds threshold value π at the particular time when the magnitude of angle offset is measured, the system will, in step 470, adjust the satellite footprint to compensate for the relative motion of the Earth at the particular latitude over which the satellite is situated. This adjustment to the footprint could comprise adjusting the orientation of the footprint at a given time so that the longitudinal axis 120 (FIG. 7) of footprint 90 (FIG. 7) will be in substantially parallel alignment with the CU track 700 (FIG. 7), or this footprint adjustment could comprise adjustments made to beam groups within footprint 90 with or without making any adjustment to the orientation of footprint 90.

Step 470 could be accomplished in several ways. In a preferred embodiment, step 470 comprises using an improved satellite control technique. More specifically, in a preferred embodiment, at least one satellite attitude parameter is adjusted to steer a satellite while it is flown in orbit to adjust the orientation of satellite footprint 90 with respect to CU track 700 by aligning longitudinal axis 120 (FIG. 7) of footprint 90 projected from the satellite (FIG. 7) generally parallel with the CU track 700 (FIG. 7). Satellite attitude adjustment could be accomplished dynamically by continually adjusting the satellite attitude to compensate for an actual determined angle offset value as the satellite moves over the surface of the Earth in its orbit as discussed above. This could be accomplished, at least in part, through attitude and orbit control systems located on board the satellite as described in more detail with respect to FIGS. 9–11 below. Alternatively, satellite attitude adjustments could be made based on a fixed, rather than dynamic basis. For example, satellite 20 could include a timer calibrated to inform a processor on board the satellite to adjust the satellite attitude by a predetermined parameter at a predetermined time based on knowledge of the satellite's location in its orbit at a particular time in accordance with predetermined angle offset values programmed into a processor in satellite 20 (such as, for example, angle offset values illustrated in FIG. 8).

Figure 9:
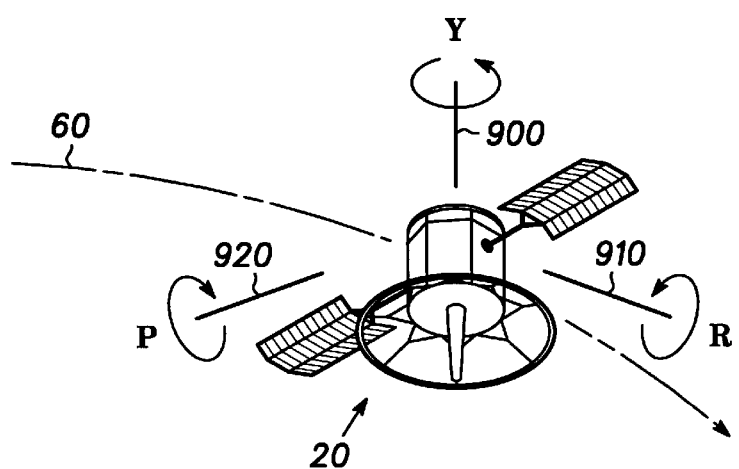
FIG. 9 illustrates a schematic view of a satellite in orbit and depicts the yaw, pitch and roll attitude parameters of a satellite.

FIG. 9 illustrates a schematic view of a satellite in orbit and depicts the yaw, pitch and roll attitude parameters of a satellite, such as satellite 20, FIG. 1. Satellite 20 moves in a direction of flight 60 desirably oriented with a yaw axis 900, which points toward the center of the Earth 50, a roll axis 910, which is parallel to the Earth's horizon, and a pitch axis 920, which is perpendicular to both yaw axis 900 and roll axis 910. In a preferred embodiment of the present invention, step 470 of method 400 (FIG. 4) comprises adjusting at least one attitude (yaw, roll, or pitch) parameter of the satellite to align longitudinal axis 120 of satellite footprint 90 (FIG. 7) generally parallel with CU track 700 (FIG. 7). Preferably, step 470 comprises implementing a yaw compensation maneuver to align the longitudinal axis 120 of footprint 90 generally parallel with CU track 700. A yaw compensation maneuver is defined herein as rotating satellite 20 (FIG. 9) about yaw axis 900 (FIG. 9) by a sufficient amount to compensate for the angle offset value determined in accordance with step 450 of method 400. This can be accomplished in any of several ways in satellite 20, as will be explained in further detail below with reference to FIGS. 10–11.

Figure 10:
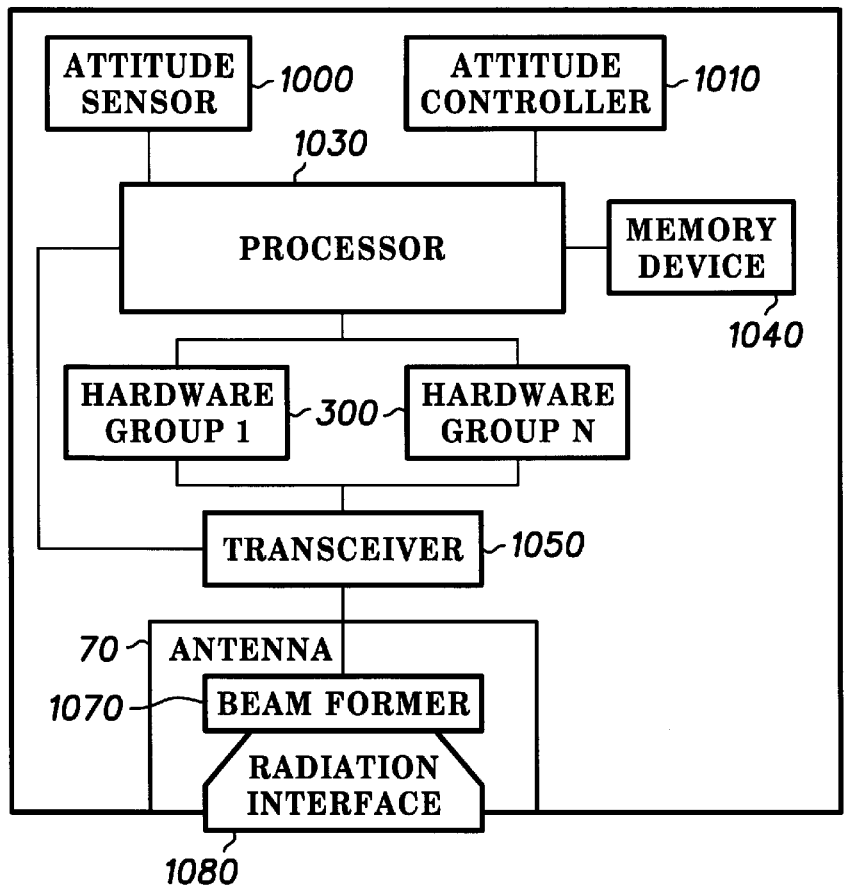
FIG. 10 illustrates a simplified block diagram of a satellite in accordance with a preferred embodiment of the present invention.
Figure 11:
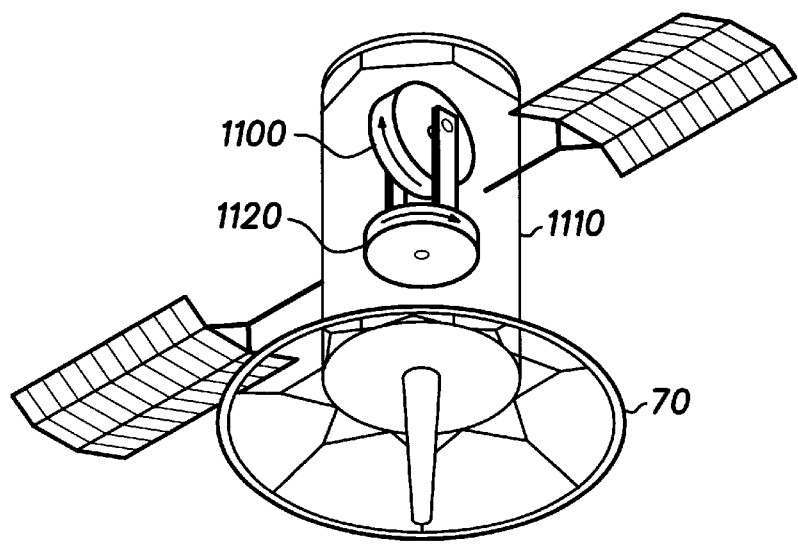
FIG. 11 illustrates a schematic view of one of numerous potential satellite designs of a satellite which could be used to achieve the benefits of the present invention.

FIG. 10 illustrates a simplified block diagram of a satellite in accordance with a preferred embodiment of the present invention. FIG. 11 illustrates a schematic view of one of numerous potential satellite designs of a satellite which could be used to achieve the benefits of the present invention. Preferably, all satellites 20 within system 10 (FIG. 1) include equipment as illustrated. Satellite 20 contains attitude sensing means, such as attitude sensor 1000. One or more attitude sensors 1000 sense satellite orientation in the yaw (900, FIG. 9), roll (910, FIG. 9), and pitch (920, FIG. 9) directions. Attitude sensor 1000 can be any one or more types of attitude sensors known to those of ordinary skill in the art, including for example, a gyroscope, a sun sensor, a star sensor, or Earth sensors, depending on the attitude parameter to be monitored. Attitude sensor 1000 is used to estimate the orientation of satellite 20 with respect to a celestial body such as the Sun or a star and possibly the Earth in some instances.

Satellite 20 also includes attitude control means, such as attitude controller 1010 for adjusting and controlling the attitude of satellite 20. Attitude controller 1010 desirably includes one or more actuators, which can be activated by one or more devices in satellite 20 or by one or more devices located on the ground or at some other point remote from satellite 20. In a preferred embodiment of the present invention, actuators comprise one or more rotating wheels known as reaction wheels. Torque reaction wheels can include "zero momentum" systems, which can turn in either direction or momentum wheels, which rotate in a single direction. In a preferred embodiment, attitude control is achieved by use of at least one rotating wheel which rotates within the body 1110 of satellite 20, as schematically depicted in FIG. 11. For larger, more complex satellites, three axis stabilization can be handled through the use of a three axis reaction wheel arrangement with three separate reaction wheels in an orthogonal arrangement, possibly including a fourth wheel as a spare. One or more momentum wheels 1100 (FIG. 11) could be mounted on a gimbal or turntable 1120, but it is not necessary to mount momentum wheel 1100 on a turntable to achieve the benefits of the present invention.

As an alternative to the use of a reaction wheel, such as momentum wheel 1100, attitude control can be achieved by firing thrusters (not shown) of the satellite. Use of thrusters for attitude control is not a preferred method of achieving attitude control in the present invention, however, because it is a relatively expensive means for achieving the desired attitude control effects.

Satellite 20 also includes a processor 1030 coupled to attitude sensor 1000 and attitude controller 1010, memory device 1040, transceiver 1050, and various hardware communication resources 300. Processor 1030 desirably receives output signals and information from attitude sensor 1000 concerning satellite attitude with respect to the Earth as satellite 20 orbits the Earth. Processor 1030 also can perform calculations to determine dynamically the magnitude of angle offset θ in accordance with step 450 of method 400 (FIG. 4) desirably using information received from attitude sensor 1000. Alternatively, processor 1030 can employ information stored in memory device 1040, such as predetermined data concerning angle offset with respect to satellite position or location, including, for example a graph containing data similar to that set forth in FIG. 8, to determine angle offset values at various points during the satellite's orbit.

Processor 1030 also can determine whether the angle offset value is greater than threshold value π in accordance with step 460 of method 400. Processor 1030 desirably is linked to one or more transceivers 1050 which, among other things, support communication with communication units (30, FIG. 1) through hardware groups 300, which also are coupled to transceiver 1050. Processor 1030 also can direct assignment of hardware groups 300 to appropriate beam groups as previously discussed with reference to FIG. 3 and discussed below with reference to FIG. 12. As previously noted, hardware groups 300 could be comprised of various combinations of hardware resources including, for example, modems, converters, switches, tuners, buffers, routers, controllers, and/or various other hardware resources used to support communication between one or more satellites 20 and communication units 30 and/or between two or more different types of communication units 30 of system 10 (FIG. 1).

Antenna 70, which includes beam former 1070 and radiation interface 1080, projects a plurality of beams or cells (140, FIG. 2) on or near the surface of the Earth. Preferably, the beams implement a spectral reuse plan such that channels are reused throughout a pattern provided by satellite 20. In a preferred embodiment, beam forming device 1070 is capable of forming and projecting a columnar arrangement of cells parallel to the direction of motion of satellite 20, such as the cell pattern illustrated in FIG. 2. Beam forming device 1070 could include lens type phased arrays which form a large number of small cells within satellite footprint 90. For example, a Rottman lens phased array would be suitable for use in the present invention. It should be recognized that other beam forming devices known to those skilled in the art could be used in the present invention.

As an alternative to the yaw compensation maneuver discussed above, the attitude adjustment step, 470, of method 400 (FIG. 4) could comprise a "roll steering maneuver" including adjusting the satellite orientation along the roll axis of the satellite to align the longitudinal axis of footprint 90 generally parallel with CU track 700, or could comprise implementing a combination of yaw and roll steering to compensate for the effects of the Earth's rotation on the alignment of the footprint with respect to the ground. Employment of a yaw steering maneuver, however, is preferable to employment of a roll steering maneuver. This is because the amount of roll steering alone that would be required to compensate for the effects of the Earth's rotation (approximately 5 degrees at 1400 km attitude) results in some distortion of the beam size and shape at the far edges of the footprint projected by the satellite, and depending on the footprint size, some beams could be lifted off of the Earth. This beam lifting effect could be made tolerable by using a more complex antenna which generates additional beams to compensate for lifted beams, or lifted beams could simply not be used.

Depending on the number of beams to be projected by the antenna and the particular orbital altitude of the satellite, a combination of yaw steering and roll steering could be used to compensate for the relative motion of the Earth at varying positions in the satellite's orbit. As the satellite orbits the Northern and Southern extremes of its path or track around the Earth, a small amount of pitch steering also could be employed. Also, extra beams could be provided at the left and right margins of the satellite antenna in combination with the attitude adjustment maneuvers, to provide a relatively straight path across the footprint to allow system users to be passed from cell to cell within a satellite and from satellite to satellite with relatively minimal hand-off requirements.

In an alternative embodiment, the width of beam groups 150 (FIG. 3) could be adjusted in step 470 of method 400 (FIG. 4) to compensate for the relative motion of the Earth by assigning one or more hardware group 300 to service a beam group comprised of multiple beam stripes. In this embodiment, satellite footprint 90 would not be physically moved, but the footprint would be adjusted internally in terms of beam group width or composition.

Figure 12:
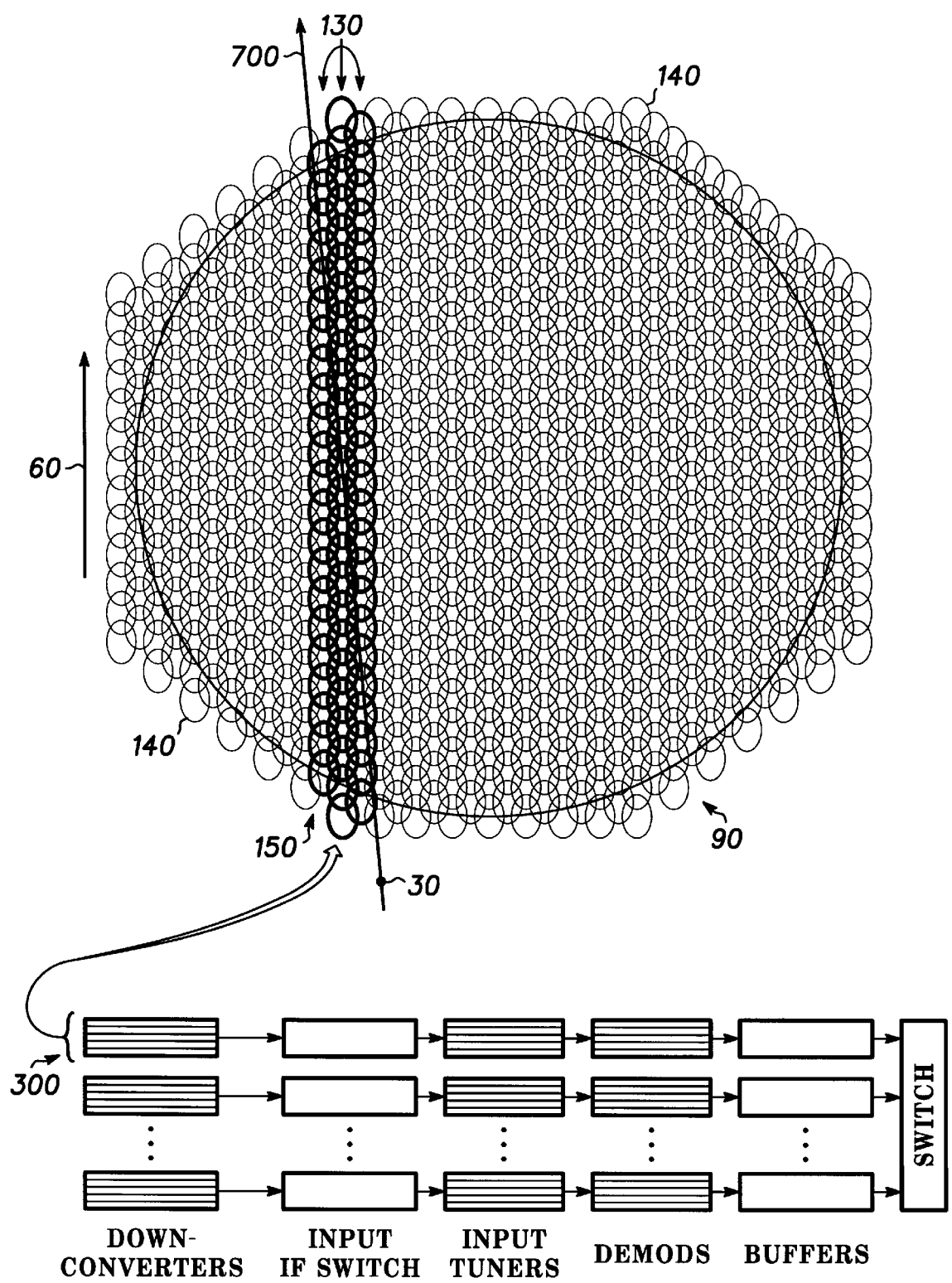
FIG. 12 illustrates a schematic depiction of a hardware group assignment to a beam group in accordance with an alternative embodiment of the present invention.

FIG. 12 illustrates a schematic depiction of a hardware group assignment to a beam group in accordance with an alternative embodiment of the present invention. In accordance with this alternative embodiment, width or composition of beam groups 150 is adjusted to provide an area sufficient to allow a CU 30 (FIGS. 1, 7) to be located within a beam group for as long as the CU is located within the footprint of the satellite. Thus, rather than defining a beam group to include a single beam stripe 130 of cells 140 (as shown for example in FIG. 3), a beam group would include multiple beam stripes. For example, as illustrated in FIG. 12, a beam group could include three beam stripes 130 all supported by hardware group 300. A CU 30 which enters footprint 90 at a first end, or a near end, of the footprint desirably would remain within a single beam group 150 and be serviced by a single hardware group as long as it remains in footprint 90 even though CU could encounter several lateral cell-to-cell hand-offs with the beam stripes 130 included within beam group 150. When the CU reaches the distant, or far end of footprint 90 it could then be handed off to the next satellite footprint passing overhead.

In a preferred embodiment of the present invention, footprint 90 is receiving or transmitting radiated energy from or to a CU on or near the surface of the Earth, and footprint 90 preferably is divided into approximately 25 beam groups, each comprised of two beam stripes 130. This description of the beam stripe width used in the preferred embodiment is not intended to be limiting in any way, however, and numerous other beam group compositions could be employed without departing from the spirit of the present invention. This alternative footprint adjustment technique is desirably used, for example, in conjunction with a LEO satellites, where large areas of coverage are desirable and perfect angle offset compensation is difficult to achieve when using, for example, a wide coverage antenna, particularly one with many narrow beams. In systems providing large satellite footprints, a single footprint can, for example, cover an entire continent and span over approximately 40 degrees of latitude. Thus varying compensation could be needed at different points within a single footprint, as discussed above.

Through use of this alternative method, some of the advantages of beam management methods employing angle offset compensation techniques will still be realized, and fewer lateral cell-to-cell hand-offs are required than with prior art satellite systems. Employing this alternative embodiment will result in more lateral hand-offs than would be encountered using the preferred embodiment of the present invention (where satellite attitude is adjusted to correct for the angle offset) at latitudes near the equator, but minimal lateral hand-offs will be experienced at higher latitudes. For satellite-to-satellite hand-offs occurring at higher latitudes, where satellite velocity is approximately tangential to the Earth's rotation, a CU (or multiple CUs) can be admitted in the center of a beam group 150 at a first end of the footprint and can travel through to the distant the end of the footprint, probably with no lateral hand-offs between beam stripes 130 within the beam group 150. CU's which, because of their entering position in a footprint, necessitate lateral hand-offs within a footprint before they reach the distant end of the footprint, and for example, pass outside of the boundaries of a first beam group 150 at a half way point, or some other point within footprint 90, could be handled by a one or more hardware groups in an adjacent beam group 150, but would still experience less hardware switching than a CU traveling through a, nonaligned, non-uniform path in footprint 90.

In yet another alternative footprint adjustment technique, step 470 could comprise electrical or mechanical antenna adjustment on board the satellite to correct for the rotational motion of the Earth's surface by pointing the antenna in a desired direction. This could be accomplished by mounting the satellite antenna on a rotating base capable of rotating by several degrees to compensate for the offset. However, this technique is not preferable because it is highly cumbersome to implement. Implementing this technique would require designing the satellite antenna so that the hundreds (and possibly thousands in relatively large satellites) of connections would be capable of motion. Moreover, use of this technique could result in satellite reliability problems as these hundreds (or thousands) of connections would be moved numerous times (at least once per orbit, approximately twelve times per day), causing substantial wear on the connections during each orbit thus possibly decreasing the life span of the connections.

In summary, the present invention provides, among other things, an improved method and apparatus for beam management in a satellite communication system, comprised, at least in part, of satellites which move with respect to the surface of the Earth. The present invention also provides a method and apparatus to improve and enhance management of hardware resources in a satellite communications system. The method and apparatus of the present invention greatly simplify the complexity of the satellite payload by managing satellite beams or cells and hardware resources in a manner which decreases the payload capability requirements by simplifying the hand-off. This is accomplished through grouping satellite hardware resources into hardware groups, which are assigned to support one or more beam groups. Satellite attitude adjustment, antenna direction adjustment, or alternatively by adjustment of the width of beam groups can be used to correct for an angle offset arising between a longitudinal axis of the satellite footprint and relatively fixed points on the ground arising as a result of the relative motion of the Earth with respect to the satellite providing the footprint.

The foregoing description of the specific embodiments will so fully reveal the general nature of the invention that others can, by applying current knowledge, readily modify or adapt for various applications such specific embodiments without departing from the generic concept and, therefore, such adaptations and modifications should and are intended to be comprehended within the meaning and range of equivalents of the disclosed embodiments. It is to be understood that the phraseology or terminology employed herein is for the purpose of description and not of limitation. Accordingly, the invention is intended to embrace all such alternatives, modifications, equivalents and variations as fall within the spirit and broad scope of the appended claims.

While the present invention has been described above in connection with a specific method and apparatus and with reference to a preferred embodiment, it is to be clearly understood that this description is made only by way of example and not as a limitation on the scope of the invention. Those skilled in the art will recognize that changes and modification could be made in the preferred embodiment without departing from the scope of the present invention.

What is claimed is:

1. A method of beam management in a satellite system having a satellite operating in an orbit around a celestial body and a communication unit (CU) adapted to communicate with said satellite, said satellite having a plurality of hardware resources and a radiation interface adapted to transmit or receive radiated energy within a satellite footprint divided into a plurality of cells, the method comprising the steps of:

a) arranging the plurality of cells to form a plurality of beam stripes extending substantially across said footprint;

b) grouping said plurality of beam stripes into a plurality of beam groups;

c) grouping said plurality of hardware resources of said satellite into a plurality of hardware groups;

d) assigning one of said plurality of hardware groups to one of said plurality beam groups; and e) supporting transmission or reception of radiated energy by the radiation interface occurring within said one of said plurality of beam groups with said one of said plurality of hardware resources assigned in step (d).

2. The method as claimed in claim 1, wherein said satellite has a direction of flight and said plurality of beam stripes are extending substantially across said footprint in a direction corresponding to said direction of flight.

3. The method as claimed in claim 1, wherein said satellite system has a first CU, said first CU being located at a point on or near the surface of the celestial body and having an apparent direction of travel through said footprint along a path represented by a CU track, and wherein said satellite footprint has a longitudinal axis corresponding to said direction of flight of said satellite, said longitudinal axis having an orientation with respect to said CU track, the method further comprising the step of:

f) adjusting said footprint to allow said first CU to remain within a first beam group of said plurality of beam groups during a time in which said first CU is located within a coverage area of said footprint.

4. The method as claimed in claim 3, wherein said step f) comprises the step of:

c1) adjusting said orientation of said longitudinal axis to allow said first CU to remain within said first beam group during a time in which said first CU is located within said footprint.

5. The method as claimed in claim 3, wherein said step f) comprises the step of:

f1) adjusting said orientation of said longitudinal axis such that said longitudinal axis is in substantially parallel alignment with said CU track.

6. The method as claimed in claim 3, wherein said first beam group has a width, said width representing one or more adjacent beam stripes, and wherein said step f) comprises the step of:

f1) adjusting said width of said first beam group to allow said first CU to remain within said first beam group for a substantial portion of time during which said first CU is located within said footprint.

7. The method as claimed in claim 6, wherein said step f1) comprises the step of adjusting said width of said first beam group to allow said first CU to remain within said first beam group for as long as said first CU is located within said footprint.

8. The method as claimed in claim 3, wherein said CU track and said longitudinal axis encounter an angle offset as said satellite passes over certain latitudes of said celestial body as a result of a relative motion of said celestial body with respect to said satellite, the method further comprising the steps of:

g) determining a magnitude of said angle offset; and h) if said magnitude of said angle offset exceeds a predetermined threshold magnitude π, adjusting said footprint to compensate for said angle offset.

9. The method as claimed in claim 8, wherein step h) comprises the step of adjusting said orientation of said longitudinal axis such that said longitudinal axis is in substantially parallel alignment with said CU track.

10. The method as claimed in claim 8, wherein step h) comprises the step of:

h1) adjusting said orientation of said satellite footprint in accordance with an angle offset averaging technique, said angle offset averaging technique comprising determining an angle offset value as a weighted average of multiple angle offset values determined for various latitudes covered by said satellite footprint.

11. The method as claimed in claim 10, wherein said angle offset averaging technique further comprises the step of:

h2) determining said angle offset value as said weighted average of multiple angle offset values determined for one or more locations within said footprint where said footprint predominately covers land rather than water.

12. The method as claimed in claim 10, wherein said angle offset averaging technique further comprises the step of:

h2) determining said angle offset value as said weighted average of multiple angle offset values determined, at least in part, as a function of a location of concentration of system users.

13. The method as claimed in claim 8, wherein said satellite has a yaw axis, a roll axis, and a pitch axis, and has multiple attitude parameters corresponding to said yaw axis, said roll axis, and said pitch axis, and wherein step h) comprises the step of adjusting at least one attitude parameter of said satellite to compensate for said angle offset.

14. The method as claimed in claim 8, wherein said satellite has a yaw axis, a roll axis, and a pitch axis, and has multiple attitude parameters corresponding to said yaw axis, said roll axis, and said pitch axis, and wherein said adjusting step h) comprises, at least in part, the step of implementing a yaw compensation maneuver, which includes steering said satellite along said yaw axis to align said longitudinal axis of said footprint with said CU track.

15. The method as claimed in claim 14, wherein said yaw compensation maneuver comprises, at least in part, employing at least one rotating wheel to steer said satellite about said yaw axis to align said longitudinal axis of said footprint substantially with said CU track.

16. The method as claimed in claim 8, wherein said satellite has a yaw axis, a roll axis, and a pitch axis, and has multiple attitude parameters corresponding to said yaw axis, said roll axis, and said pitch axis, and wherein said adjusting step h) comprises the step of employing a roll steering maneuver to rotate said satellite about said roll axis to align said longitudinal axis of said footprint substantially with said CU track.

17. The method as claimed in claim 8, wherein said satellite has a yaw axis, a roll axis, and a pitch axis, and has multiple attitude parameters corresponding to said yaw axis, said roll axis, and said pitch axis, and wherein said adjusting step h) comprises the step of adjusting said satellite attitude by steering said satellite about both said yaw axis and said roll axis to align said longitudinal axis of said footprint substantially with said ground track.

18. The method as claimed in claim 8, wherein said satellite has a yaw axis, a roll axis, and a pitch axis, and has multiple attitude parameters corresponding to said yaw axis, said roll axis, and said pitch axis, and wherein said adjusting step h) comprises the step of adjusting said satellite attitude by steering said satellite about said yaw axis, said roll axis, and said pitch axis to align said longitudinal axis of said footprint substantially with said CU track.

19. The method as claimed in claim 8, wherein said radiation interface has an orientation corresponding to an orientation of said satellite footprint, and wherein said adjusting step h) comprises the step of adjusting said orientation of said radiation interface to alter said orientation of said satellite footprint such that said longitudinal axis is in substantial alignment with said CU track.

20. A method for beam management in a satellite communication system having at least one communication unit (CU) and at least one satellite operating in an orbit around a celestial body, said satellite having a direction of flight and having a radiation interface adapted to transmit or receive radiated energy within a satellite footprint on or near the surface of said celestial body, said satellite further including a plurality of hardware resources, the method comprising the steps of:
  a) partitioning said footprint into multiple beam stripes extending substantially across said footprint in a direction corresponding to said direction of flight;
  b) grouping said multiple beam stripes into multiple beam groups;
  c) grouping said hardware resources of said satellite into multiple hardware groups;
  d) assigning one of said multiple hardware groups to support one of said multiple beam groups; and
  e) supporting transmission or reception of the radiated energy by the radiation interface occurring within said one of said multiple beam groups with said one of said multiple hardware groups assigned in step d).

21. The method as claimed in claim 20, wherein at least one of said multiple beam stripes are partitioned into multiple cells.

22. The method as claimed in claim 21, wherein said multiple cells extend across said footprint in a direction corresponding to said direction of flight.

23. The method as claimed in claim 20, wherein said satellite footprint has a longitudinal axis corresponding to said direction of flight, wherein said at least one CU is located at a point on or near the surface of the celestial body and is handed-off between multiple cells within said footprint along a path represented by a CU track, wherein said longitudinal axis has an orientation with respect to said CU track, and wherein said CU track and said longitudinal axis encounter an angle offset as said satellite passes over certain latitudes of said celestial body as a result of a relative motion of the celestial body with respect to said satellite as said satellite orbits said celestial body, the method further comprising the steps of:
  f) determining a magnitude of said angle offset; and
  g) if said magnitude of said angle offset exceeds a predetermined threshold magnitude π, adjusting said footprint to allow said first CU to remain within a first beam group of said multiple beam groups during a time in which said first CU is located within said coverage area of said footprint.

24. The method as claimed in claim 23, wherein step g) comprises the step of adjusting said orientation of said satellite footprint such that said longitudinal axis is in substantial alignment with said CU track.

25. The method as claimed in claim 23, wherein said satellite has a yaw axis, a roll axis, and a pitch axis, and has multiple attitude parameters corresponding to said yaw axis, said roll axis, and said pitch axis, and wherein step g) comprises the step of adjusting at least one attitude parameter of said satellite to compensate for said angle offset.

26. The method as claimed in claim 25, wherein said adjusting step g) comprises, at least in part, the step of implementing a yaw compensation maneuver, which includes steering said satellite along said yaw axis to align said longitudinal axis of said footprint substantially with said CU track.

27. The method as claimed in claim 26, wherein said yaw compensation maneuver comprises, at least in part, the step of employing at least one rotating wheel to steer said satellite about said yaw axis to align said longitudinal axis of said footprint substantially with said CU track.

28. The method as claimed in claim 25, wherein the adjusting step g) comprises the step of employing a roll steering maneuver to rotate said satellite about said roll axis to align said longitudinal axis of said footprint substantially with said CU track.

29. The method as claimed in claim 25, wherein said adjusting step g) comprises the step of adjusting said satellite attitude by steering said satellite about both said yaw axis and said roll axis to align said longitudinal axis of said footprint substantially with said CU track.

30. The method as claimed in claim 25, wherein said adjusting step g) comprises the step of adjusting said satellite attitude by steering said satellite about said yaw axis, said roll axis, and said pitch axis to align said longitudinal axis of said footprint substantially with said CU track.

31. The method as claimed in claim 23, wherein said radiation interface has an orientation corresponding to an orientation of said satellite footprint, and wherein step g) comprises the step of adjusting said orientation of said radiation interface to alter said orientation of said satellite footprint such that said longitudinal axis is in substantial alignment with said CU track.

32. The method as claimed in claim 23, wherein a beam group has a width, said width representing a number of adjacent beam stripes, and wherein step g) comprises the step of adjusting the width of a first beam group to allow a first CU of said at least one CU to remain within said first beam group for a substantial portion of a time during which said first CU is located within said footprint.

33. The method as claimed in claim 20, wherein a beam group has a width, said width representing a number of adjacent beam stripes, the method further comprising the step of:
  f) defining the width of a first beam group to include a number of beam stripes sufficient to allow a first CU of said at least one CU to remain within said first beam group for a substantial portion of a time during which said first CU is located within said footprint.

34. The method as claimed in claim 20, wherein a beam group has a width, said width representing a number of adjacent beam stripes, the method further comprising the step of:
  f) defining the width of a first beam group to include a number of beam stripes sufficient to allow a first CU of said at least one CU to remain within said first beam group for as long as said first CU is located within said footprint.

35. The method as claimed in claim 34, wherein said width includes at least one beam stripe.

* * * * *